United States Patent [19]

Gibart

[11] Patent Number: 5,274,781
[45] Date of Patent: Dec. 28, 1993

[54] PROGRAMMABLE CONTROLLER MODULE IDENTIFICATION BY INTERCONNECTING THE INPUT AND OUTPUT PORTS OF A MODULE IN A PREDEFINED MANNER

[75] Inventor: Anthony G. Gibart, Milwaukee, Wis.

[73] Assignee: Allen-Bradley Company, Inc., Milwaukee, Wis.

[21] Appl. No.: 550,247

[22] Filed: Jul. 6, 1990

Related U.S. Application Data

[63] Continuation of Ser. No. 223,809, Jul. 25, 1988, abandoned.

[51] Int. Cl.$^5$ .............................................. G06F 9/00
[52] U.S. Cl. ................................. 395/325; 364/929.4; 364/940.61; 364/942.51; 364/946.4; 364/947.5; 364/949; 364/949.4; 364/DIG. 2; 395/800
[58] Field of Search ............... 395/275, 325, 800; 364/141, DIG. 1, DIG. 2

[56] References Cited

U.S. PATENT DOCUMENTS

| 3,942,158 | 3/1976 | Dummermuth | 364/900 |
| 4,165,534 | 8/1979 | Dummermuth et al. | 364/900 |
| 4,263,650 | 4/1981 | Bennett et al. | 364/200 |
| 4,442,504 | 4/1984 | Dummermuth et al. | 364/900 |
| 4,807,161 | 2/1989 | Comfort et al. | 364/550 |
| 4,849,931 | 7/1989 | Ishii et al. | 395/275 |

Primary Examiner—Thomas C. Lee
Assistant Examiner—Maria N. Von Buhr
Attorney, Agent, or Firm—Quarles & Brady

[57] ABSTRACT

A programmable controller includes a processor module and a number of input/output modules housed in a rack. Each input/output module contains a circuit that identifies characteristics of the module to the processor module. The circuit has a parallel input port and a parallel output port The outputs and inputs of the two ports are interconnected in a predefined manner according to the module characteristics. In addition, inputs of the input port are coupled to either a positive or negative voltage source to identify other module characteristics. By sequentially sending data to the output port and then reading data from the input port of each input/output module, the processor can identify the characteristics of the modules in the programmable controller.

11 Claims, 6 Drawing Sheets

PROGRAMMABLE CONTROLLER MODULE IDENTIFICATION BY INTERCONNECTING THE INPUT AND OUTPUT PORTS OF A MODULE IN A PREDEFINED MANNER

This application is a continuation of application Ser. No. 07/223,809, filed Jul. 25, 1988, now abandoned.

BACKGROUND OF THE INVENTION

The present invention relates to programmable controllers having a plurality of modules for performing different functions which operate a machine in response to the execution of a control program; and more particularly to a mechanism for identifying each type of module within the programmable controller.

Programmable controllers are typically connected to industrial equipment, such as assembly lines and machine tools, to sequentially operate the equipment in accordance with a stored control program. One type of such programmable controller is disclosed in U.S. Pat. No. 4,293,924 and consists of a rack which contains several functional modules. A rack backplane provides signal buses and connectors for electrically coupling the functional modules. One of these modules contains a processor which sequentially executes the control program. The control program is stored in a memory within the processor module and is executed to examine the condition of selected sensing devices on the controlled equipment, or to energize and deenergize selected operating devices on the controlled equipment contingent upon the status of one or more of the examined sensing devices. Also contained within the rack are a number of input/output (I/O) modules, which interface the processor to the sensing and operating devices. A given programmable controller can have a variety of different types of I/O modules, such as a.c. inputs or outputs, d.c. inputs or outputs, analog inputs or outputs, and open or closed loop positioning modules.

One of the benefits of this type of programmable controller is that by varying the mix of I/O module types, the programmable controller can be configured to operate a wide variety of equipment and its configuration can be changed with alterations to the equipment. However, this advantage also presents a problem in that when a module in the programmable controller is replaced with one of a different type, the control program must be edited accordingly. Should one of the I/O modules be inadvertently replaced with a different type of module or should an intentional replacement of the I/O modules be made without corresponding program editing, the control program will be unable to properly operate the equipment with potentially devastating consequences.

Therefore, it is desirable that the programmable controller, prior to executing the control program, be able to identify the type of each I/O module within the system and confirm that each module corresponds to the type expected to be found by the execution of the control program. Previously, module identification was accomplished by storing a set of identification bytes in a read only memory of the module. However, "non-intelligent" I/O modules do not require such memories, and adding them solely for identification purposes would not be cost effective.

SUMMARY OF THE INVENTION

A programmable controller has a processor for executing a control program which directs the operation of a machine to perform a specific function. Also included in the programmable controller is one or more input/output modules which interface the processor to sensing and operating devices on the machine. Each of the I/O modules includes circuitry which enables the processor to identify the I/O module's type. This circuitry includes an input port and an output port, each of which in the preferred embodiment is a multi-bit parallel port having a terminal for each of the parallel data bits. Both the input and output ports are addressable by the processor, enabling the processor to send data to the output port and receive data from the input port. The input and output ports are interconnected in a predefined manner according to the specific type of I/O module, thereby enabling the processor module by writing data to the output port and reading the data back through the input port to identify the type of I/O module.

The general object of the present invention is to provide a programmable controller which allows its processor to identify the characteristics of each I/O module contained in the programmable controller.

Another object is to provide such identification utilizing input and output ports on the module.

Yet another object is to provide a system for identifying the module characteristics, which utilizes a single input and a single output port in a manner which enables a large number of different types of modules to be identified.

A further object of the present invention is to provide such an identification system which can be expanded as the number of different types of modules increases.

DETAILED DESCRIPTION OF THE PRESENT INVENTION

Figure 1:
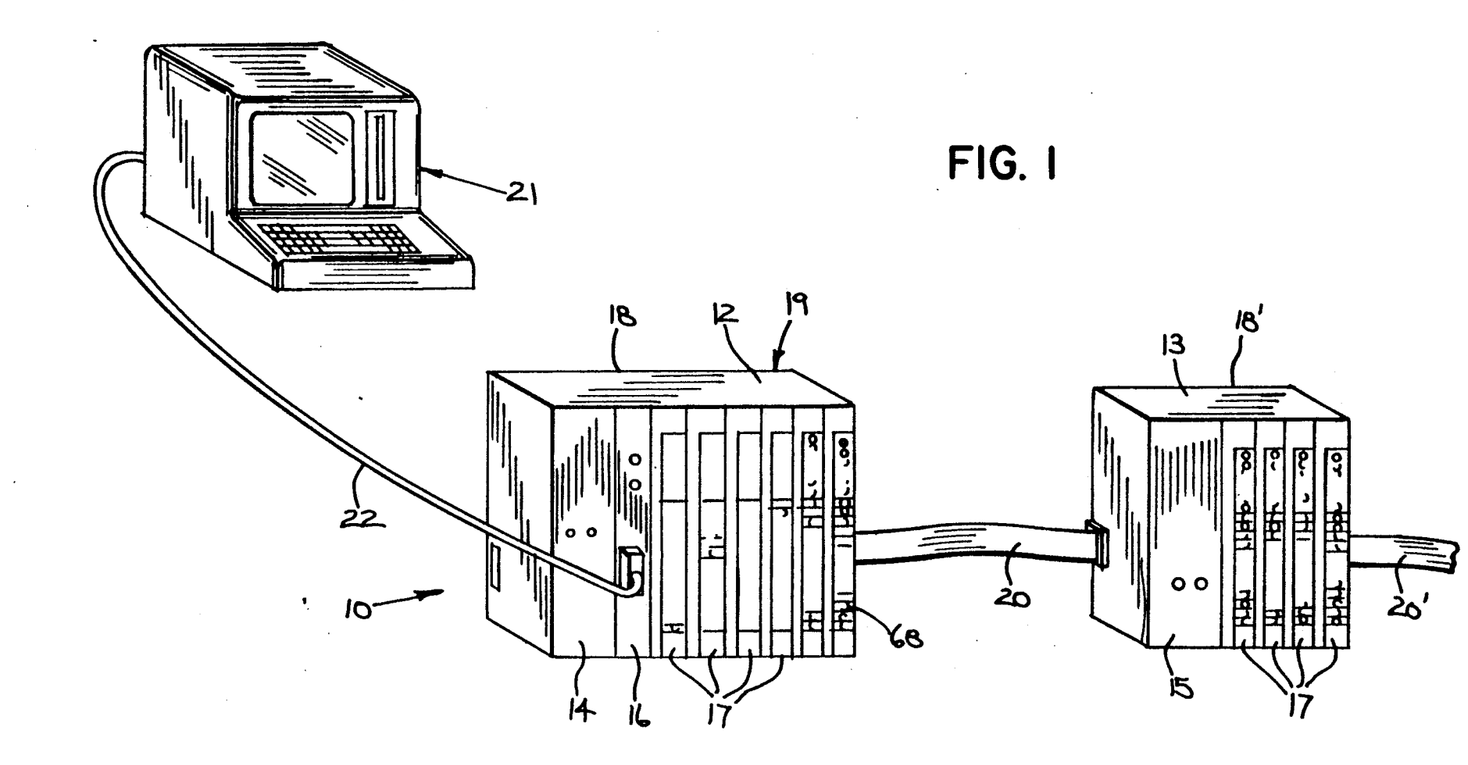
FIG. 1 is a pictorial representation of a programmable controller according to the present invention.
Figure 2:
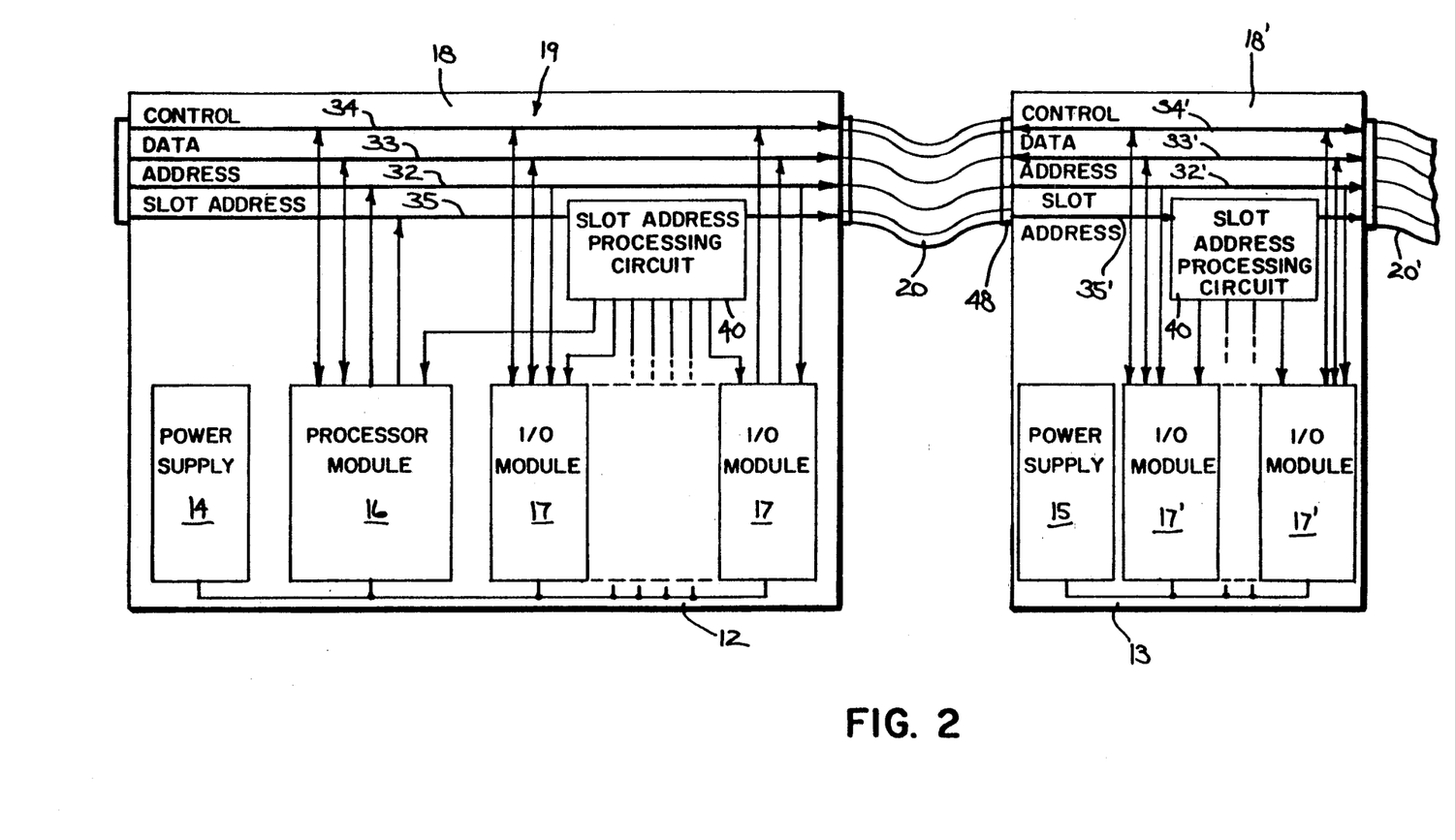
FIG. 2 is a schematic representation of the electrical interconnection of the racks and modules of the programmable controller.

With initial reference to FIGS. 1 and 2, a programmable controller, generally designated as 10, includes two racks 12 and 13 with separate power supplies 14 and 15 respectively. Each of the racks 12 and 13 has a number of slots within which different functional modules 16 and 17 can be received. A unique address is assigned to each rack slot in order to access the module received therein. The two racks 12 and 13 also include a backplane 18 and 18' respectively, having electrical connectors and conductor buses which interconnect the functional modules 16, and 17 and 17' provide power to the modules from the power supplies 14 and 15. Specifically, the backplanes 18 and 18' incorporate a parallel address bus 32 and 32', a parallel data bus 33 and 33', a set of control lines 34 and 34' and a five bit parallel slot address bus 35 and 35'. Although separate address and data buses have been shown, a common bus onto which both address and data signals are time multiplexed can also be used. A separate connector is provided on the backplane for each slot in the rack to couple these buses and control lines to a module in the slot. A multiconductor cable 20 interconnects the backplanes 18 and 18' of the two racks 12 and 13 to form a common system backplane, designated 19. Another multiconductor cable 20' extends the system backplane from the second rack 13 to other racks of the programmable controller which are not illustrated. The racks are connected in a daisy chain by the cables 20 and 20'.

The first rack 12 contains a processor module 16 which executes a user defined control program stored in the module's memory to operate a machine coupled to the programmable controller 10. A programming terminal 21 is connected by a cable 22 to the processor module 16 for monitoring the operation of the programmable controller and for programming the processor module 16. The processor module 16 is connected to the backplane buses 32, 33 and 35 and control lines 34.

The first rack 12 also contains a number of input/output modules 17 which electrically interface the processor 16 to sensing and operating devices on the machine controlled by the programmable controller 10. As used herein, the term I/O module refers to a module which interfaces to external devices on the controlled machine. Such I/O modules can have solely an input function, solely an output function, or both input and output functions. I/O modules which provide an input function couple the processor module 16 to sensing devices on the controlled machine, while the output function modules interface to operating devices on the controlled machine. Each of the I/O modules may be an a.c. input or output device, a d.c. input or output device, or provide an input/output interface to analog devices, such as resolvers and position indicators. The typical programmable controller 10 includes a mix of different types of I/O modules.

Figure 3:
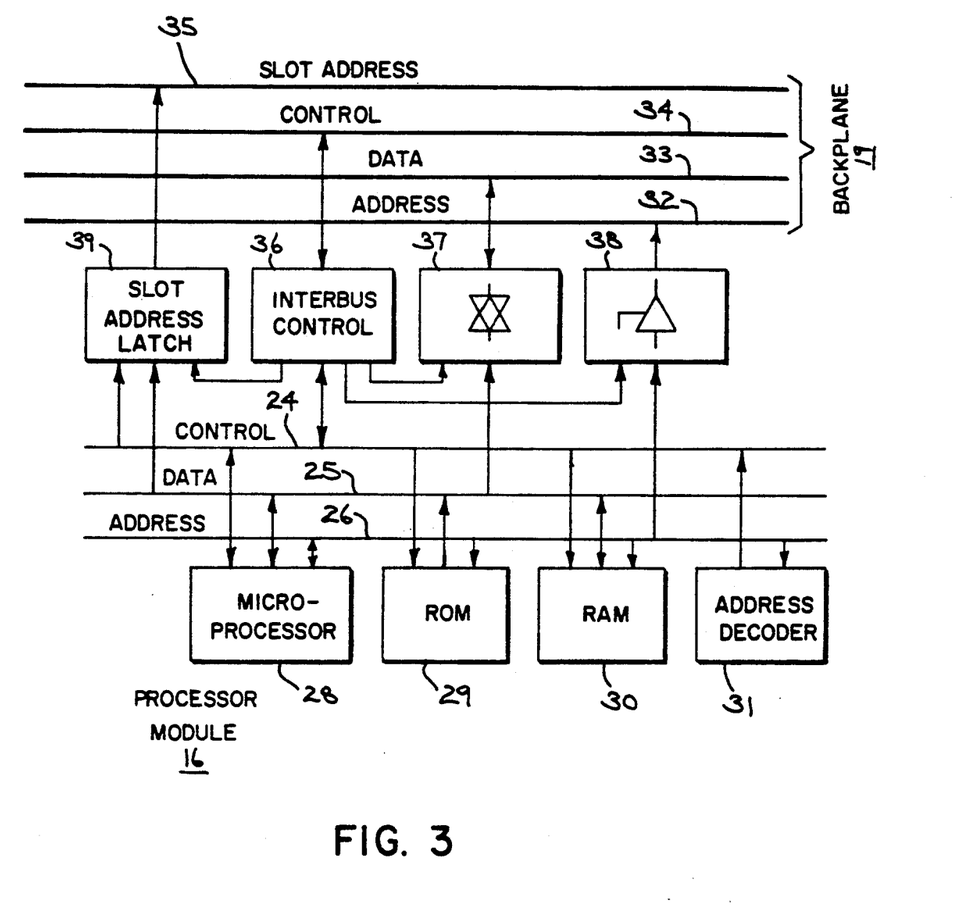
FIG. 3 is a schematic block diagram of the programmable controller processor module.

The different components of the processor module 16, shown schematically in FIG. 3, are interconnected by a set of three internal buses: a control bus 24 consisting of a number of individual control lines running between different components, a parallel data bus 25 and a parallel address bus 26. A microprocessor 28 is coupled to the three internal buses 24–26. Depending upon the type of microprocessor 28, the address and data signals may be multiplexed onto a shared bus with a control signal indicating which type of signal is being carried by the shared bus at any given time. The microprocessor 28 executes an operating system program stored in a read only memory (ROM) 29 which controls the overall operation of the programmable controller 10 and executes a user defined machine control program that is stored within a random access memory (RAM) 30. Also stored in RAM 30 is a standard input/output data table which retains the status of the sensing and operating devices. The RAM 30 also provides storage locations for counters, timers and intermediate computation values used by the microprocessor 28 in executing the operating and user control programs. An address decoder 31 responds to specific addresses sent over the module address bus 26 by generating control signals on bus 24 which enable the microprocessor to access memories 29 and 30, as well as the system backplane 19.

Access to the system backplane 19 by either the processor module 16 or by another module is governed by an interbus control circuit 36 which can comprise any of several well known circuits for performing bus access arbitration. In response to the proper request signal, the interbus control circuit 36 enables a set of bidirectional data buffers 37 to couple the internal data bus 25 of the processor module 16 to the backplane data bus 33. Similarly, the interbus control 36 enables a set of address buffers 38 to couple the processor module address bus 26 to the backplane address bus 32. A slot address latch 39 can be enabled by the interbus control circuit 36 to apply a five bit data word in parallel from the processor module data bus 25 to a backplane slot address bus 35.

The interconnection of the internal buses of the processor module 16 to those of the backplane 19 enables the microprocessor 28 to selectively access any one of the I/O modules 17 in the racks 12 and 13. As far as the operation of the processor module 16 is concerned, the interconnected racks are viewed as one large rack with many slots and modules. In such a system, the slot closest to the processor module 16 is designated as slot 1 and the address of each slot going away from the processor module increases along the chain. The first rack 12 has seven slot addresses 0–6, including the one in which the processor module is located, and the four slots in the second rack 13 have addresses 7–10. To address a given module, the microprocessor stores the address of the module's slot in the slot address latch 39. The interbus control circuit 36 will then enable the slot address latch 39 to apply its contents to the slot address bus 35 across the system backplane 19. The backplane of each rack includes a slot address processing circuit 40, shown in FIG. 2, which responds to an address of a slot within its rack by producing a slot select signal for that slot. The slot select signal activates the module in the respective slot to respond to signals on the other backplane buses. Once the slot address has been sent, the microprocessor 28 sends the address of a component within the selected module over the backplane address bus 32 by having the interbus control circuit 36 enable the set of address buffers 38. At the same time the interbus control circuit 36 enables the set of data buffers 37 so that data may be exchanged between the addressed I/O module 17 and the processor module 16.

By employing this addressing technique, the processor module 16 can acquire sensor data from input modules and send state data to the operating devices via output modules in the racks. A generic discrete input module 60 is shown schematically in FIG. 4. The input module 60 has a component address decoder 62 coupled to the backplane address bus 32. The component address decoder 62 in a given module is enabled by a high level slot select signal and a high level address strobe signal from a backplane control line applied to a first AND gate 63. When enabled, the component address decoder 62 responds to a first predefined address sent over the address bus 32 by generating a high level data input enable signal on line 64 which is connected to an input of a second AND gate 65. Another input of the second AND gate 65 receives an active on high I/O READ signal from a backplane control bus line 61.

Figure 4:
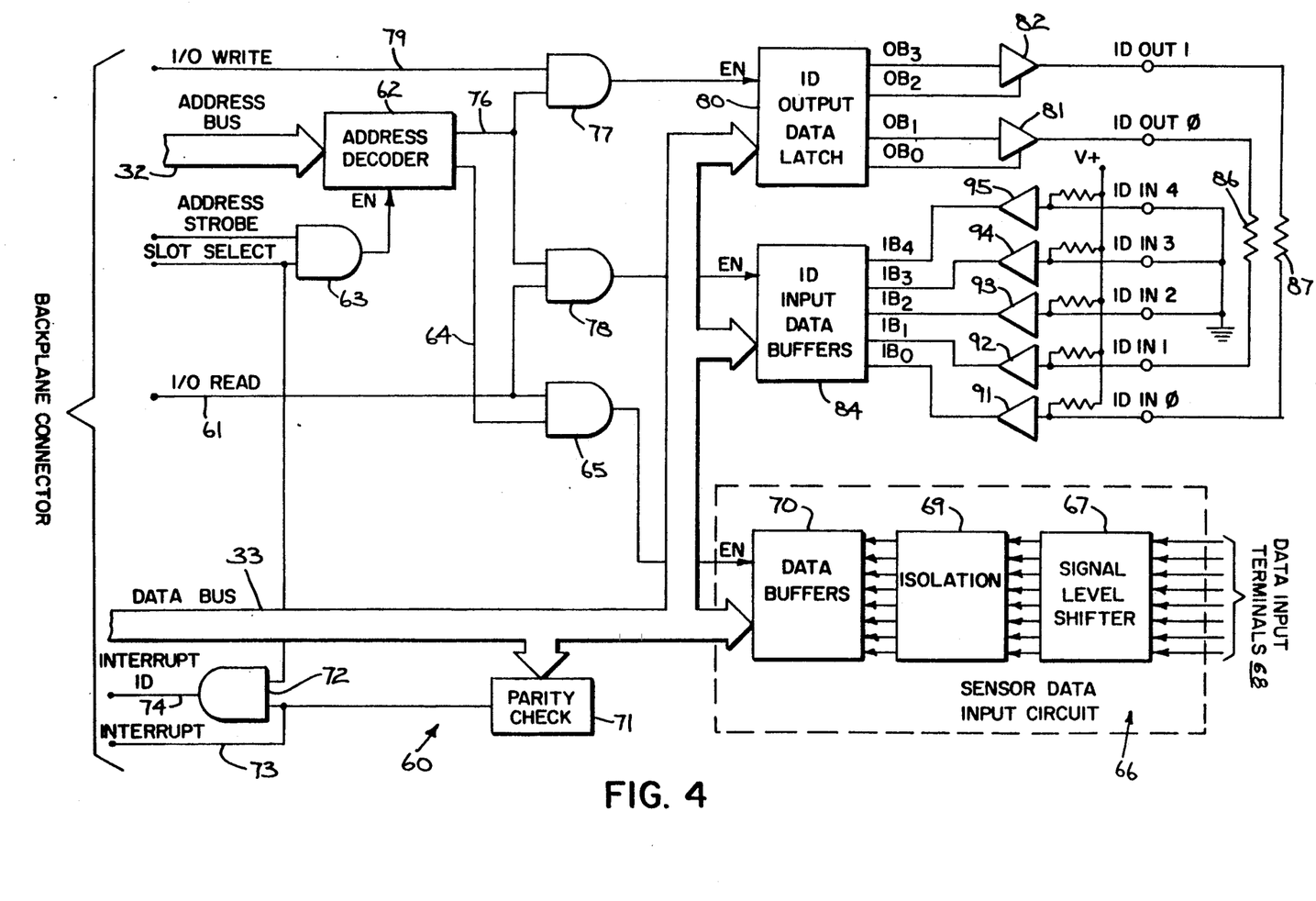
FIG. 4 is a block schematic diagram of a generic input type I/O module.

When the I/O module 60 simultaneously receives high level address strobe, slot select and I/O READ signals along with the first predefined address over the backplane buses, a sensor data input circuit 66 is enabled. This couples data from the sensing devices to the backplane data bus 33. Specifically, external sensing devices (not shown) are connected to eight data inputs of a signal level shifter circuit 67 by a set of terminals 68 on the front of the module (see FIG. 1). Typically, each sensing device acts as a switch which when closed applies a given voltage level, for example 230 volts AC, to one of the data input terminals 68. The signal level shifter circuit 67 converts the voltage levels from the sensing devices into a relatively low voltage that is compatible with the logic devices in the programmable controller modules. The eight outputs of the signal level shifter 67, corresponding to the eight inputs, are connected to an isolation circuit 69 which electrically isolates the sensing devices from the remaining circuitry of the programmable controller 10. The isolation circuit 69 includes a separate electro-optical coupler for each data input from a sensing device. The eight outputs of the isolation circuit 69 are connected to the inputs of a set of eight tri-state data buffers 70 connected to the backplane data bus 33. When the data buffers 70 are enabled by a signal from the second AND gate 65, the isolation circuit outputs are coupled to lines of the backplane data bus 33. This applies the eight bits of data from the sensing devices to the processor module 16.

The I/O module 60 also includes circuit 71 which checks the parity of each byte of data received over the data bus with a parity bit sent with the byte. If the parities do not match, the circuit 71 generates an interrupt signal on line 73 of the backplane control bus 34 which is common to all I/O modules 17. The interrupt signal is coupled to a periodically polled input of microprocessor 28 in the processor module 16. The interrupt signal also is coupled to an input of a third AND gate 72, which has another input that receives the slot select signal from the backplane slot address processing circuit 40. The output of the third AND gate 72 is connected to an interrupt identification (ID) control line 74 of the backplane control bus 34. The interrupt ID control line 74 is connected to an input of the processor modules microprocessor 28.

When a high logic level interrupt signal is generated by the parity checking circuit 71, the microprocessor 28 in the processor module 16 interrupts its normal program execution and commences a parity interrupt handling routine. This routine sequentially addresses each I/O module and inspects the level of an interrupt ID control line 74 on the backplane control bus 34 to find the interrupt generating module. When the I/O module that generated the interrupt signal is addressed, its slot select line will go high. This high logic level applied to the third AND gate 72 together with the high logic level of the interrupt signal produces a high level on the interrupt ID control line 74. This signal on line 74 indicates to the microprocessor 28 which I/O module generated the parity interrupt and perhaps which interrupt handling routine to execute. In other types of I/O modules, an interrupt signal can be generated in response to an external signal or a module signal processing error. If several I/O modules generate separate interrupts simultaneously, each one will be polled in slot address order and their interrupts will be processed sequentially.

As the I/O modules 17 are interchangeable in the rack slots, a potential exists that two or more modules may be inserted in different slots than the ones designated in the control program. If the modules are incorrectly positioned in the racks, different sensing and operating devices will be addressed by the processor during program execution. In order to detect erroneously located modules, each module has an addressable circuit which provides several identification codes back to the processor module. Typically, each type of I/O module has a different set of these codes, however, the codes can also be used to distinguish among modules of the same type having different functions with respect to the controlled machine.

The module identification circuit is illustrated in the schematic diagram of FIG. 4. The component address decoder 62, when enabled by the slot select and address strobe signals, also responds to a second predefined address by generating a high level identification enable signal on line 76. This enable line 76 is coupled to inputs of fourth and fifth AND gates, 77 and 78, respectively. A second input of the fourth AND gate 77 is connected to an I/O write control line 79 from the backplane control bus 34. The output of the fourth AND gate 77 is connected to the enable input of a four bit ID output data latch 80 having its data inputs coupled to four lines of the backplane data bus 33. The four outputs, $OB_0$–$OB_3$, from the output data latch 80 are connected to two separate tri-state data buffers 81 and 82. Two outputs, $OB_1$ and $OB_3$, are coupled to the data inputs of the data buffers 81 or 82, while the other two outputs, $OB_0$ and $OB_2$, are connected to the output enable inputs of these data buffers. The outputs of the two data buffers 81 and 82 are designated ID OUT$\emptyset$ and ID OUT1 respectively and form a two bit parallel output port.

The output of the fifth AND gate 78 is coupled to the enable input of a set of five ID input data buffers 84 having their tri-state outputs connected to the five least significant bit lines of the backplane data bus 33. Each input $IB_0$–$IB_4$ of the five data buffers of set 84 is connected to an output of one of five buffer amplifiers 91–95. A separate pull-up resistor couples each input of the five buffer amplifiers to a source of positive voltage $V^+$. The inputs of the five buffer amplifiers 91–95 are designated ID IN$\emptyset$ through ID IN4 and collectively form a parallel input port.

Identification codes for a particular I/O module are formed by connecting selected bit lines of the input port to ground potential and/or to the bit lines of the output port. One set of codes, formed by coupling different ID input port lines ID IN$\emptyset$ through ID IN4 to ground, identifies the number of inputs and outputs for the I/O module, referred to herein as I/O mix information. An exemplary set of these codes is given in the table of Appendix A. Thirty-two I/O mix types can be identified by these different connections of the ID input port lines. For each I/O mix type, the logic level of the five ID input port lines is shown. A "zero" in the table indicates that the line is connected to ground. A "one" in the table designates that the line is not connected to ground, but is held at a high level due to the pull-up resistor.

A second set of identification codes provides the electrical characteristics of the module. An exemplary set of these codes is given in the table of Appendix B. The codes identifying the module's electrical characteristics are defined by connecting one or both of the ID output port lines (ID OUT$\emptyset$ and ID OUT1) to a specific ID input port line. This interconnection as shown in Appendix B provides information about an input module's signal (AC, DC, etc) and the switching device of an output module (relay, triac, etc.).

With reference to the specific I/O module 60 illustrated in FIG. 4, lines ID IN2, ID IN3 and ID IN4 of the input port are directly connected to ground. This grounding produces an I/O mix input bit pattern of 00011 which designates that the module has eight inputs and no outputs (see Appendix A). The two lines ID OUT∅ and ID OUT1 of the output port are coupled by resistors 86 and 87 to bit lines ID IN1 and ID IN∅, respectively of the input port. This interconnection identifies the module as having 230 volt AC inputs (see Appendix B). In other identification code connections, a single input port line can be coupled to both ground and an output port line by separate resistors.

Figure 5A:
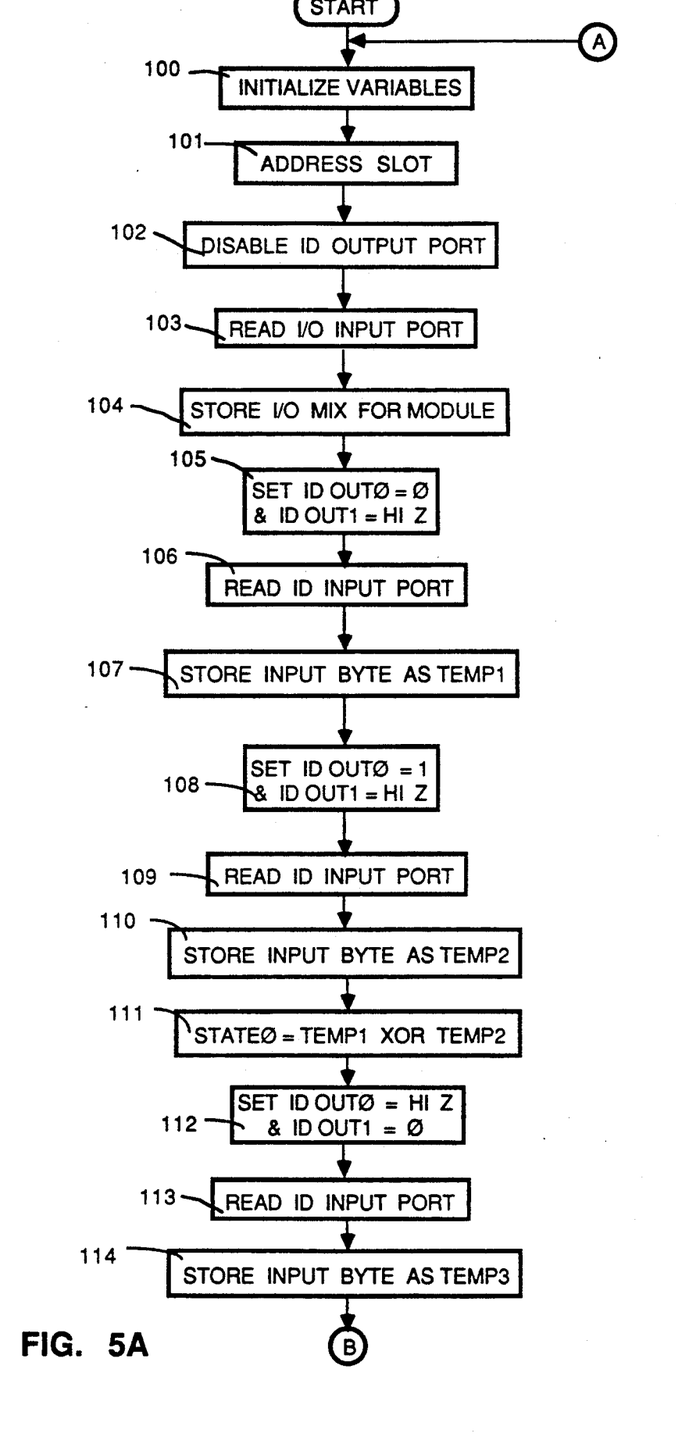
FIGS. 5A and 5B form a flowchart of a module identification routine, which is executed by the processor module.
Figure 5B:
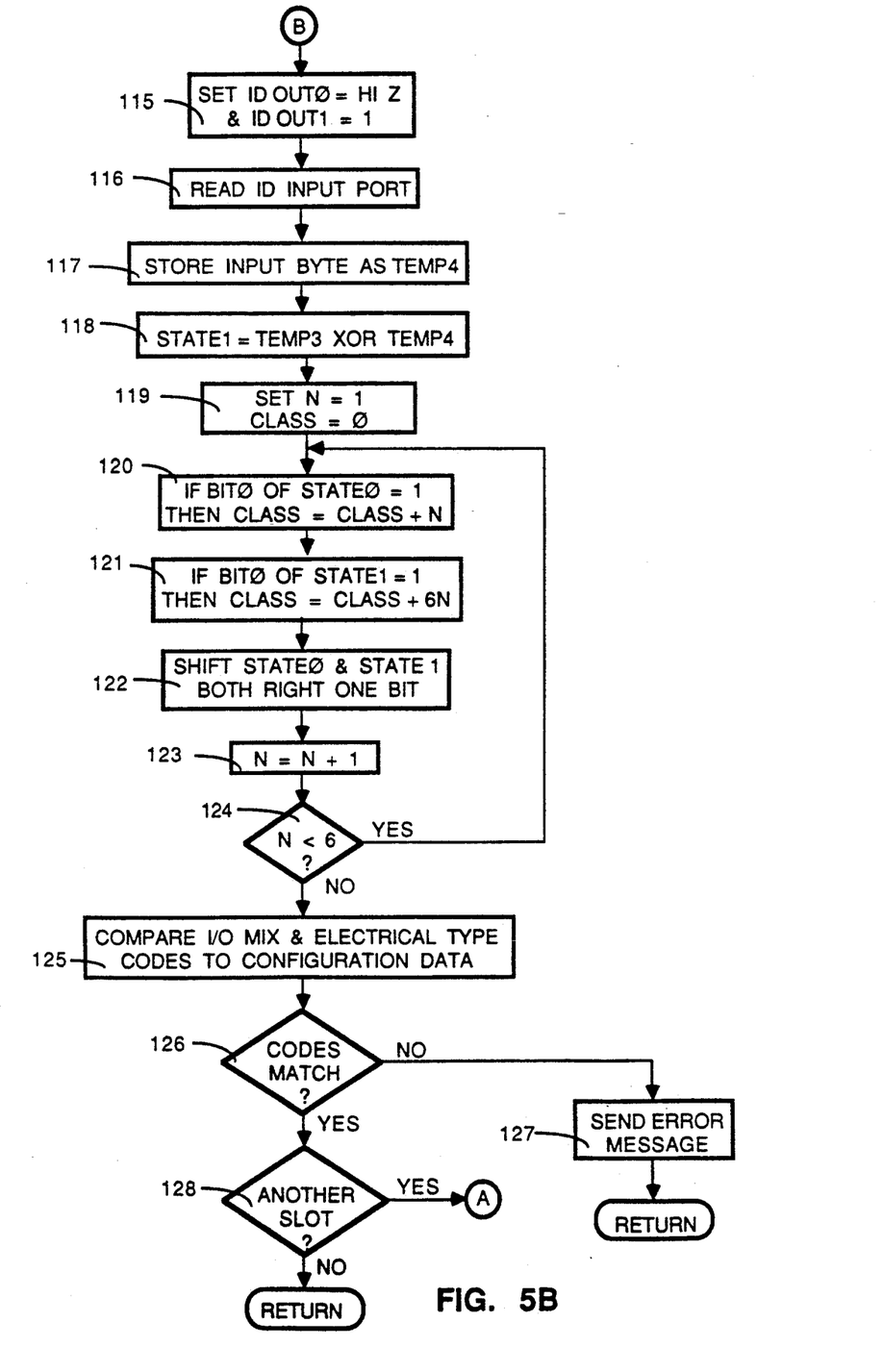

Whenever the processor module 16 is placed in the control program execution mode, it initially conducts a scan of each rack slot to determine the type of module in that slot. A flowchart of the I/O module identification routine is shown in FIGS. 5A and B. The routine commences by the microprocessor 28 of the processor module in FIG. 2 initializing the variables used in the routine at step 100. Then at step 101, the microprocessor 28 loads the slot address latch 39 with the address of the rack slot containing the module 17 to be identified. Once the processor module 16 has accessed the system backplane 19, the address is sent over the slot address bus 35. In response to the slot address signal on the backplane 19, the rack slot address processing circuit 40 in the rack containing the addressed slot sends an active slot select signal to the module 17 in that slot.

Then, data is sent to the ID output data latches 80 which disables the ID output port at step 102. This is accomplished by the microprocessor 28 sending the second predefined address, that of the ID port, over the backplane address bus 32 to the module. Both the ID input and output ports share this second address with the I/O read and write control signals determining which port becomes coupled to the backplane data bus 33. At this time, the interbus control circuit 36 of the processor module 16 has been instructed to send active signals over the address strobe and I/O write lines of control bus 34. In response to these signals, the component address decoder 62 (FIG. 4) sends an active ID enable signal on line 76. This enable signal combined with the active I/O write signal at the fourth AND gate 77 enable the ID output data latches 80 to store four bits of the data from the data bus 33. These four data bus bits become bits $OB_0$–$OB_3$ at the output of the data latches 80. Bits $OB_0$ and $OB_2$ are both held low and place data buffers 81 and 82 in their tri-state, or high impedance, output mode. Therefore, logic level signals are not applied via resistors 86 to 87 between the input and output ports in this mode.

With the ID port address still being sent over the address bus 32, the microprocessor 28 removes the active I/O write signal and renders the I/O read signal on control line 61 active at flowchart step 103. This action enables the ID input data buffers 84 causing them to couple the data bits $IB_0$–$IB_4$ from the five buffer amplifiers 91–95 onto the data bus 33. These bits represent the logic levels produced by coupling selected bit lines of the ID input port to ground (i.e. lines ID IN2, ID IN3 and ID IN4 for the I/O module 60 illustrated in FIG. 4). The microprocessor 28 reads these bits to determine the number of discrete inputs and outputs of the I/O module 60 as given by the I/O mix table of Appendix A. As described above, the bit pattern 00011 is generated at the input port by the ground connection of terminals ID IN2 through ID IN4 in the exemplary module 60.. This binary pattern designates I/O mix type 3, indicating that the modules has eight inputs and no outputs as shown in Appendix A. This binary designation of the I/O mix for the module is stored in the RAM 30 of the processor module 16 at step 104.

The identification routine next identifies the module's electrical characteristics. Initially at step 105, the microprocessor 28 again addresses the ID output port and stores the bit pattern (0001) in the ID output data latch 80. This pattern causes the first buffer amplifier 81 to produce a low level output (0), while maintaining the second buffer amplifier 82 in the high impedance (HI Z) tri-state condition. The ID input port is then read by the microprocessor 28 obtaining data bits from the ID input data buffers 84 at step 106. These data bits are stored in a location of RAM 30 designated TEMP1 at step 107. Then at step 108, the microprocessor 28 changes the ID output data latch 80 to produce a high logic level from the first buffer amplifier 81 at terminal ID OUT∅ while maintaining the second buffer amplifier 82 in the tri-state condition. The ID input port is read again at step 109 and the results are stored in RAM 30 in a location designated TEMP2 at step 110.

In order to determine to which ID input port lines the ID OUT∅ terminal is coupled, the values of TEMP1 and TEMP2 must be exclusive OR'ed (XOR). This will mask the effects of the pull-up resistors and ground connections at the inputs of the five buffer amplifiers 91–95 which provide the I/O mix code. The result of the exclusive OR'ing at step 111 is the binary number (00010) having a one in the bit location to which the ID OUT∅ line was coupled. This number is then stored in as a variable designated STATE∅.

The process of toggling one of the ID output port lines between one and zero and reading the ID input port is repeated at steps 112 through 117 for output port line ID OUT1. The results read from the ID input port, TEMP3 and TEMP4 are exclusive OR'ed to produce a binary number (00001) assigned to variable STATE1, which indicates the bit line of the input port that is coupled to bit line ID OUT1 of the output port at step on FIG. 6B.

The values of STATE∅ and STATE1 must be converted into a single number that corresponds to the class of the I/O module electrical characteristics as designated in Appendix B. This conversion is carried out in the next section of the module identification routine commencing at step 119 where a bit counter variable N is set equal to 1 and a variable called CLASS is set to zero. Then, the values of STATE∅ and STATE1 are inspected to compute the electrical characteristic class. At step 120, the microprocessor 28 tests whether bit ∅ of STATE∅ equals one, which indicates that the least significant bit of the ID input port was coupled to the ID OUT∅ bit line of the ID output port. If the equality is found, the value of N is added to the variable CLASS. The value of STATE1 is similarly examined at step 121 and if its bit ∅ is found to equal one, six times the value of N is added to CLASS. At step 122, the microprocessor 28 shifts the bits of variables STATE∅ and STATE1 one bit to the right so that the next least significant bit can be examined on the next loop through this section of the module identification routine. Then at step 123, the bit counter N is incremented and the new value of N is tested at decision step 124 to determine if all the bits of variables STATE∅ and STATE1 have been inspected. If N is less than six, indicating bits still remain to be inspected, the routine returns to step 120. After all of the bits of variables STATE∅ and STATE1 have been examined, the routine advances to step 125.

Once all of the bits have been examined, the value of the variable CLASS will correspond to the class of the module's electrical characteristics given in the table of Appendix B. The I/O mix code and the electrical characteristic code are compared at step 125 with the values defined for this module by the user during system configuration. If the codes read from the module do not match the configuration data as determined at step 126, the program execution advances to step 127 where an error message is sent to the user via terminal 21 (FIG. 1). The program execution then ends and returns to the main system program to await corrective action.

If at step 126 the module is found to be as specified in the system configuration data, the module identification routine tests whether additional rack slots remain at step 128. If so, the program execution returns to step 100 where the module in the next slot is identified. This process repeats for each slot and then returns to the main program.

APPENDIX A

| I/O MIX INFORMATION | | | | | | | |
|---|---|---|---|---|---|---|---|
| I/O MIX TYPE | ID INPUT PORT LINE | | | | | NO. OF INPUTS | NO. OF OUTPUTS |
| | 4 | 3 | 2 | 1 | 0 | | |
| 0 | 0 | 0 | 0 | 0 | 0 | 2 | 0 |
| 1 | 0 | 0 | 0 | 0 | 1 | 4 | 0 |
| 2 | 0 | 0 | 0 | 1 | 0 | 6 | 0 |
| 3 | 0 | 0 | 0 | 1 | 1 | 8 | 0 |
| 4 | 0 | 0 | 1 | 0 | 0 | 12 | 0 |
| 5 | 0 | 0 | 1 | 0 | 1 | 16 | 0 |
| 6 | 0 | 0 | 1 | 1 | 0 | 24 | 0 |
| 7 | 0 | 0 | 1 | 1 | 1 | 32 | 0 |
| 8 | 0 | 1 | 0 | 0 | 0 | 2 | 2 |
| 9 | 0 | 1 | 0 | 0 | 1 | 2 | 4 |
| 10 | 0 | 1 | 0 | 1 | 0 | 4 | 2 |
| 11 | 0 | 1 | 0 | 1 | 1 | 4 | 4 |
| 12 | 0 | 1 | 1 | 0 | 0 | 4 | 6 |
| 13 | 0 | 1 | 1 | 0 | 1 | 4 | 8 |
| 14 | 0 | 1 | 1 | 1 | 0 | 6 | 4 |
| 15 | 0 | 1 | 1 | 1 | 1 | 6 | 6 |
| 16 | 1 | 0 | 0 | 0 | 0 | 6 | 8 |
| 17 | 1 | 0 | 0 | 0 | 1 | 8 | 4 |
| 18 | 1 | 0 | 0 | 1 | 0 | 8 | 6 |
| 19 | 1 | 0 | 0 | 1 | 1 | 8 | 8 |
| 20 | 1 | 0 | 1 | 0 | 0 | UNDEFINED | |
| 21 | 1 | 0 | 1 | 0 | 1 | UNDEFINED | |
| 22 | 1 | 0 | 1 | 1 | 0 | UNDEFINED | |
| 23 | 1 | 0 | 1 | 1 | 1 | UNDEFINED | |
| 24 | 1 | 1 | 0 | 0 | 0 | 0 | 2 |
| 25 | 1 | 1 | 0 | 0 | 1 | 0 | 4 |
| 26 | 1 | 1 | 0 | 1 | 0 | 0 | 6 |
| 27 | 1 | 1 | 0 | 1 | 1 | 0 | 8 |
| 28 | 1 | 1 | 1 | 0 | 0 | 0 | 12 |
| 29 | 1 | 1 | 1 | 0 | 1 | 0 | 16 |
| 30 | 1 | 1 | 1 | 1 | 0 | 0 | 24 |
| 31 | 1 | 1 | 1 | 1 | 1 | 0 | 32 |

APPENDIX B

| I/O MODULE ELECTRICAL CHARACTERISTICS | | | | |
|---|---|---|---|---|
| CLASS | ID OUT1 | ID OUT0 | INPUT TYPE | OUTPUT TYPE |
| 0 | OPEN | OPEN | 115 VAC | DELAY |
| 1 | OPEN | ID IN0 | 230 VAC | RELAY |
| 2 | OPEN | ID IN1 | 115/230 VAC | RELAY |
| 3 | OPEN | ID IN2 | 115 VAC | TRIAC |
| 4 | OPEN | ID IN3 | 230 VAC | TRIAC |
| 5 | OPEN | ID IN4 | 115/230 VAC | TRIAC |
| 6 | ID IN0 | OPEN | 24 VDC (SINK) | TRIAC |
| 7 | ID IN0 | ID IN0 | 115 VAC | TRIAC (ZERO CROSS) |
| 8 | ID IN0 | ID IN1 | 230 VAC | TRIAC (ZERO CROSS) |
| 9 | ID IN0 | ID IN2 | 115/230 VAC | TRIAC (ZERO CROSS) |
| 10 | ID IN0 | ID IN3 | 24 VAC/VDC | TRIAC (ZERO CROSS) |
| 11 | ID IN0 | ID IN4 | 24 VAC/VDC | RELAY |
| 12 | ID IN1 | OPEN | 24 VDC (SINK) | RELAY |
| 13 | ID IN1 | ID IN0 | 24 VDC (SINK) | TRANSISTOR (SOURCE) |
| 14 | ID IN1 | ID IN1 | 24 VDC (SINK) | TRANSISTOR (SINK) |
| 15 | ID IN1 | ID IN2 | TTL | TTL |
| 16 | ID IN1 | ID IN3 | BCD | BCD |
| 17 | ID IN1 | ID IN4 | ANALOG | UNDEFINED |
| 18 | ID IN2 | OPEN | 24 VAC/VDC | TRIAC |
| 19 | ID IN2 | ID IN0 | 24 VDC (SINK) | TRIAC (ZERO CROSS) |
| 20 | ID IN2 | ID IN1 | 24 VDC (SOURCE) | RELAY |
| 21 | ID IN2 | ID IN2 | 24 VDC (SOURCE) | TRANSISTOR (SOURCE) |
| 22 | ID IN2 | ID IN3 | 24 VDC (SOURCE) | TRANSISTOR (SINK) |
| 23 | ID IN2 | ID IN4 | 24 VDC (SOURCE) | TRIAC |
| 24 | ID IN3 | OPEN | 24 VDC (SOURCE) | TRIAC (ZERO CROSS) |
| 25 | ID IN3 | ID IN0 | UNDEFINED | UNDEFINED |
| 26 | ID IN3 | ID IN1 | UNDEFINED | UNDEFINED |
| 27 | ID IN3 | ID IN2 | UNDEFINED | UNDEFINED |
| 28 | ID IN3 | ID IN3 | UNDEFINED | UNDEFINED |
| 29 | ID IN3 | ID IN4 | UNDEFINED | UNDEFINED |
| 30 | ID IN4 | OPEN | UNDEFINED | UNDEFINED |
| 31 | ID IN4 | ID IN0 | UNDEFINED | UNDEFINED |
| 32 | ID IN4 | ID IN1 | UNDEFINED | UNDEFINED |
| 33 | ID IN4 | ID IN2 | UNDEFINED | UNDEFINED |
| 34 | ID IN4 | ID IN3 | UNDEFINED | UNDEFINED |
| 35 | ID IN4 | ID IN4 | UNDEFINED | UNDEFINED |

I claim:

1. In a programmable controller having a processor for executing a control program, an address bus and data bus; an I/O module comprising:
    means for connecting said I/O module to the address and data bus;
    a parallel data output port having a plurality of outputs, and being addressable by said processor through the address bus to send data through said output port which data the I/O module received from the processor through the data bus;

a parallel data input port having a plurality of inputs, and being addressable by said processor through the address bus to obtain data which the I/O module receives through said input port to send data through the data bus to said processor and means for coupling at least two of the outputs of said output port to given inputs of said input port in a predefined manner which identifies the I/O module when the processor reads data from said parallel data input port.

2. The programmable controller as recited in claim 1 wherein said output port includes a means for storing data from said processor.

3. The programmable controller as recited in claim 1 wherein said input port further includes means for coupling one of two voltage levels to each of the inputs.

4. In a programmable controller having a processor for executing a control program which defines the operation of a machine to perform a specific function, a module with given functional characteristics for interfacing the processor to the machine, and address and data buses to which the processor and the module are electrically coupled; the module comprising:

means coupled to the address and data buses for electrically interfacing with the processor;

means for electrically interfacing with the machine in response to signals on the data bus;

an output port which when enabled by a first signal on the address bus applies data from the data bus to a set of port output lines;

an input port which when enabled by a second signal on the address bus applies data from a set of port input lines to the data bus; and means for coupling a first defined number of port output lines to a second defined number of port input lines in a pattern defined by functional characteristics of the module.

5. The programmable controller as recited in claim 4 wherein said output port includes a means for storing data from the data bus and applying the stored data to the set of port output lines.

6. The programmable controller as recited in claim 4 wherein said input port further includes means for applying one of two different voltage levels to the input lines depending on the functional characteristics of the module.

7. A module for a programmable controller in which the programmable controller has a processor coupled to an address bus and a data bus; said module comprising:

means for electrically coupling said module to the address and the data buses;

a first port means for applying data from the data bus to an output in response to a signal on the address bus;

a second port means, having an input for receiving data, for applying data from the input to the data bus in response to a signal on the address bus; and means for coupling the output of said first port means to the input of said second port means in a manner that encodes data identifying characteristics of said module when data is read from said second port means by the processor.

8. The module as recited in claim 7 wherein said first port means includes a means for storing data from the data bus and applying the stored data to the output of said first port means.

9. The module as recited in claim 8 wherein said second port means includes a plurality of parallel input lines, and said means for coupling connects the output of said first port means to one of said plurality of parallel input lines.

10. The module as recited in claim 7 wherein:

the output of said first port means includes a plurality of output lines:

the input of said second port means includes a plurality of input lines; and said means for coupling connects output lines of said first port means to input lines of said second port means in a pattern defined by the characteristics of the module.

11. The module as recited in claim 10 wherein said second port means further includes means for applying one of two different voltage levels to each of the input lines depending on the characteristics of the module.

* * * * *